United States Patent
Guillou et al.

(10) Patent No.: US 9,342,281 B2
(45) Date of Patent: May 17, 2016

(54) METHOD FOR ALLOWING DISTRIBUTED RUNNING OF AN APPLICATION AND RELATED PRE-PROCESSING UNIT

(75) Inventors: Aurélien Guillou, Perros Guirec (FR); Hernit Bhatia, London (GB); Elise Vennegues, Sainte-Agnès (FR); Nishantha Pelendage, London (GB)

(73) Assignee: FRANCE TELECOM, Paris (FR)

( * ) Notice: Subject to any disclaimer, the term of this patent is extended or adjusted under 35 U.S.C. 154(b) by 221 days.

(21) Appl. No.: 13/278,763

(22) Filed: Oct. 21, 2011

(65) Prior Publication Data
US 2012/0102452 A1    Apr. 26, 2012

(30) Foreign Application Priority Data
Oct. 22, 2010  (EP) .................................... 10306152

(51) Int. Cl.
*G06F 9/45*     (2006.01)
(52) U.S. Cl.
CPC ..................................... *G06F 8/433* (2013.01)
(58) Field of Classification Search
CPC ............................................................. G06F 8/433
USPC .......................................................... 717/106
See application file for complete search history.

(56) References Cited

U.S. PATENT DOCUMENTS

| | | | |
|---|---|---|---|
| 6,385,636 B1 * | 5/2002 | Suzuki ........................... | 718/105 |
| 6,658,657 B1 * | 12/2003 | Lueh ........................ | G06F 9/443 717/116 |
| 6,996,615 B1 * | 2/2006 | McGuire ....................... | 718/105 |
| 8,413,120 B2 * | 4/2013 | Emberling .................... | 717/127 |
| 8,595,289 B2 | 11/2013 | Nandlall et al. | |
| 8,640,108 B2 * | 1/2014 | Bellows ................... | G06F 8/443 717/100 |
| 8,789,138 B2 * | 7/2014 | Reierson .................. | G06F 9/541 709/201 |
| 8,954,980 B2 * | 2/2015 | Stubbs ..................... | G06F 1/329 718/100 |
| 2003/0061200 A1 * | 3/2003 | Hubert et al. ....................... | 707/3 |
| 2003/0084091 A1 | 5/2003 | Agarwalla et al. | |
| 2003/0084435 A1 | 5/2003 | Messer et al. | |
| 2003/0187998 A1 * | 10/2003 | Petit ...................... | H04L 63/102 709/229 |
| 2005/0005006 A1 * | 1/2005 | Chauffour et al. ............ | 709/223 |
| 2006/0005193 A1 | 1/2006 | Illowsky et al. | |
| 2007/0150599 A1 | 6/2007 | Neogi et al. | |
| 2008/0016508 A1 * | 1/2008 | Goto et al. ..................... | 718/102 |

(Continued)

OTHER PUBLICATIONS

Joselli et al., "Automatic Dynamic Task Distribution between CPU and GPU for Real-Time Systems", 2008, IEEE.*

(Continued)

*Primary Examiner* — Anna Deng
*Assistant Examiner* — Junchun Wu
(74) *Attorney, Agent, or Firm* — David D. Brush; Westman Champlin & Koehler, P.A.

(57) ABSTRACT

Method for allowing distributed running of an application between a device and a server connected via a network. The method includes the following steps carried out by a pre-processing unit: analyzing a code of the application for identifying parts that satisfy or are assumed to satisfy at least one first criterion based on resource consumption; transmitting only the identified application code parts to the server; generating from the application code an enriched application code arranged to call for the execution of one of the identified application code parts on the server only if at least one second criterion based on resource overload is satisfied at the time the application code part is to be run; and transmitting the enriched application code to the device.

7 Claims, 3 Drawing Sheets

(56) References Cited

U.S. PATENT DOCUMENTS

| | | | |
|---|---|---|---|
| 2008/0268828 A1 | 10/2008 | Nagaraja | |
| 2009/0248828 A1 | 10/2009 | Gould et al. | |
| 2011/0110354 A1 | 5/2011 | Jiang et al. | |
| 2011/0167404 A1* | 7/2011 | Liu | G06F 8/33 717/106 |
| 2011/0238496 A1* | 9/2011 | Gurbuxani et al. | 705/14.49 |
| 2013/0263247 A1 | 10/2013 | Jungck et al. | |

OTHER PUBLICATIONS

Nahrstedt et al., "QoS-aware resource management for distributed multimedia applications", 1998, IOS Presss.*

European Search Report and Written Opinion dated Feb. 1, 2011 for corresponding European Application No. 10 306 153.7, filed Oct. 22, 2010.

European Search Report and Written Opinion dated Feb. 1, 2011 for corresponding European Application No. 10 306 152.9, filed Oct. 22, 2010.

Dong Zhou et al., "Method Partitioning Runtime Customization of Pervasive Programs Without Design-Time Application Knowledge" Proceedings of the 23rd. International Conference on Distributed Computing Systems. ICDCS 2003. Providence, RI, May 19-22, 2003; [International Conference in Distributed Computing Systems], Los Alamitos, CA: IEEE Comp. Soc. US, vol. CONF. 23, May 19, 2003, pp. 610-619, XP010642332.

Steffen Kern et al., "Towards Adaptive Migration Strategies for Mobile Agents", Jan. 1, 2006, Innovative Concepts for Autonomic and Agent-Based Systems, Lecture Notes in Computer Science; Lecture Notes in Artificial Intelligence; LNCS, Springer, Berlin, DE, pp. 334-345, XP019053523.

"The Lex & Yacc Page." The LEX & YACC Page. Web. <<http://dinosaur.compilertools.net/#overview>>.

Casse, H., M. Couzinier, and M. Strecker. "Introduction a Lex Et Yacc." (2004/2005): Web. <<http://www.irit.fr/~Martin.Strecker/Teaching/2004/M1_S8_IUP_ISI_Traduction/intro_lex_yacc.pdf>>.

* cited by examiner

METHOD FOR ALLOWING DISTRIBUTED RUNNING OF AN APPLICATION AND RELATED PRE-PROCESSING UNIT

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to computer software application running or execution.

BACKGROUND OF THE DISCLOSURE

It is common to run an application on a single device. The latter is typically a device owned by a user who requests running of the application.

Some devices however, such as some mobile devices or others, may have limited resources, either permanently or occasionally.

As a non-limiting example, it appears that sometimes such devices are overloaded in terms of processing resource (e.g. CPU) and/or memory (e.g. RAM). This resource overload momentum may happen for instance when too many applications are running at the same time on the same device. Then, even if applications are built with dedicated compilers, the device operating system (OS) may not be able to cope with this overload. This could require to suspend/resume some of the applications based on system scheduler priorities. By doing so, the application quality of service (QoS) is impacted, in particular as far as the amount of time the application needs to provide a specific service is concerned.

SUMMARY

In order to improve this situation, an exemplary embodiment of the present disclosure relates to a method for allowing distributed running of an application between a device and a server connected via a network. The method comprises the following steps carried out by a pre-processing unit:
  analyzing a code of the application for identifying parts that satisfy or are assumed to satisfy at least one first criterion based on resource consumption;
  transmitting only the identified application code parts to the server;
  generating from the application code an enriched application code arranged to call for the execution (i.e. for the running) of one of the identified application code parts on the server only if at least one second criterion based on resource overload is satisfied at the time said application code part is to be run;
  transmitting the enriched application code to the device.

By doing so, an embodiment of the disclosure can take benefit of the resources of the remote server in addition to the resources of the device itself.

The possibility of dynamic distribution of the application running adds more flexibility to the prior art situation mentioned above. This flexibility is made even higher due to the fact that a real-time resource overload situation with respect to the device is taken into account.

A benefit for the device user is to have a better QoS (in particular a better response time) when the device is in an overload state for example. A benefit for the network operator is to extend at some levels the low-end device capabilities in order to provide to its customers value-added services, which are more designed to run on features phones.

An embodiment of the disclosure ensures that only the parts that may pose problem in terms of resource consumption can be offloaded. This avoids the server side to store too much application code. This also avoids too many message exchanges between the device and server sides, which may otherwise deteriorate QoS again.

The generation of the enriched application code by a pre-processing unit beforehand, that is before the application is run on a device, avoids computation during the running of the application by the device.

Transmitting the application code parts to the server beforehand, that is before the application is run on a device, avoids heavy transmissions during the running of the application by the device, which would otherwise imply signaling and negatively impact QoS.

The use of the enriched application code also allows the device to check the resource overload criterion only at certain points in time (i.e. each time one of the application code parts is about to be run). Permanent resource usage monitoring process running in the background is thus avoided on the device.

The use of the enriched application code simply calling for running of one of the application code parts on the server also avoids too much information to be exchanged between the device and the server.

The advantages offered by an embodiment of the disclosure are thus numerous.

According to advantageous further aspects of the disclosure that may be combined in any possible manner:
  the at least one first criterion based on resource consumption and/or the at least one second criterion based on resource overload relate to at least one of the following resource: processing resource, random access memory, storage memory, power and network bandwidth (or any combination thereof);
  transmitting the enriched application code to the device is performed responsive to the device requesting downloading of said application; in this way, the device does not have to store code for applications that it or its user does not wish to run;
  the method further comprises, after the device has started running the enriched application code and each time an application code part within the enriched application code is to be run:
    checking whether the at least one second criterion based on resource overload is satisfied with respect to the device;
    if said at least one second criterion is satisfied, calling for running the corresponding application code part on the server;
    if said at least one second criterion is not satisfied, running said application code part on the device.

An embodiment of the disclosure also proposes a pre-processing unit for allowing distributed running of an application between a device and a server connected via a network according to any one of the foregoing claims. The pre-processing unit comprises:

an analyzer for analyzing a code of the application for identifying parts that satisfy or are assumed to satisfy at least one first criterion based on resource consumption;

a transmitter for transmitting only the identified application code parts to the server;

a code generator for generating from the application code an enriched application code arranged to call for the execution (i.e. for the running) of one of the identified application code parts on the server only if at least one second criterion based on resource overload is satisfied at the time said application code part is to be run;

a transmitter for transmitting the enriched application code to the device.

The features of the above aspects which are indicated by the dependent claims may be combined as appropriate, and may be combined with any of the above aspects of the disclosure, as would be apparent to a person skilled in the art.

DETAILED DESCRIPTION OF ILLUSTRATIVE EMBODIMENTS

Figure 1:
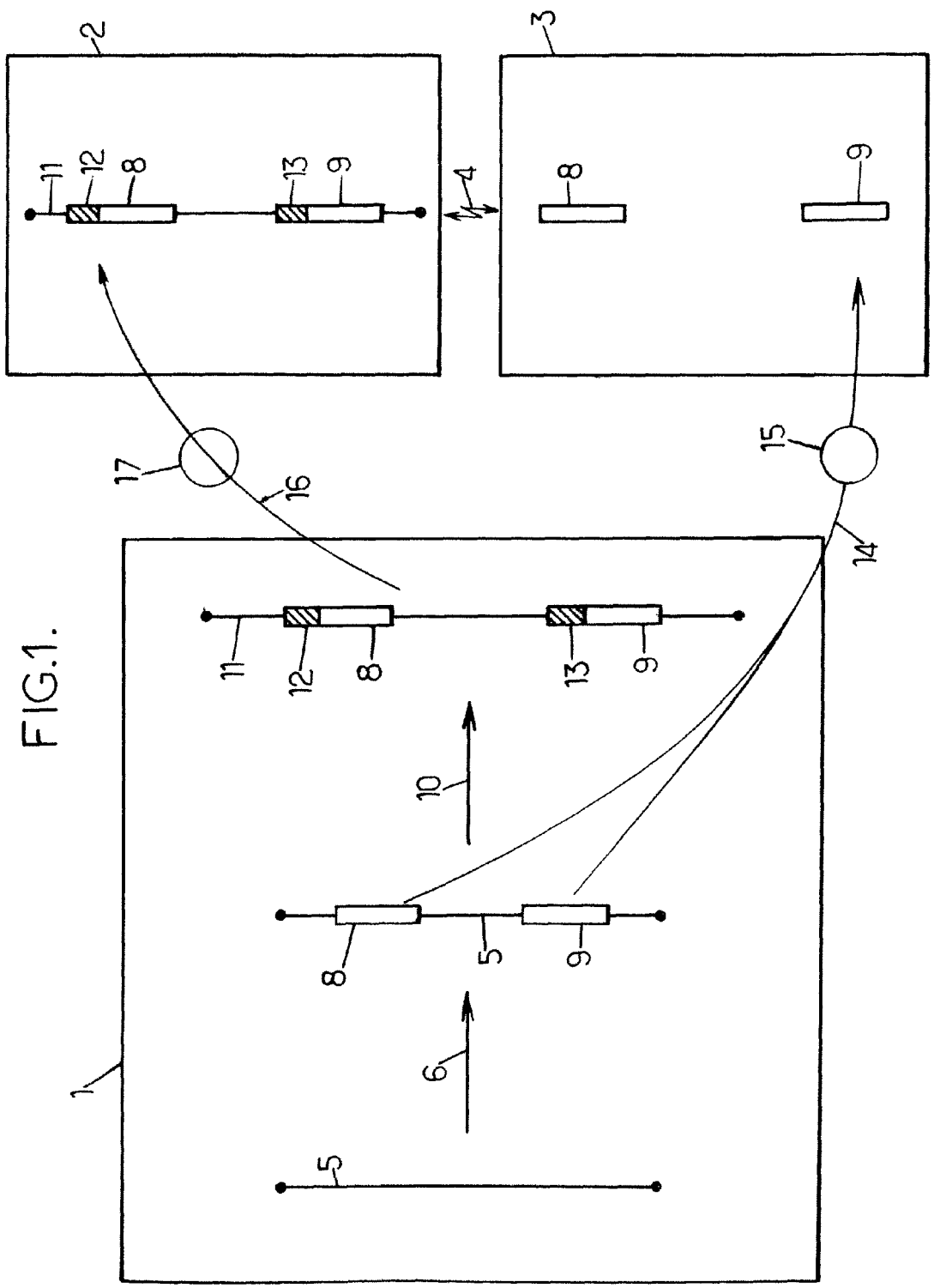
FIG. 1 is a block diagram showing pre-processing steps carried out according to an exemplary embodiment of the disclosure.

FIG. 1 shows a device 2 which can be any type of communication device, such as a laptop, a desktop, a mobile phone, a smartphone, a personal digital assistant, a tablet computer, etc.

FIG. 1 also shows a server 3 which can be any type of device or system including computing means, such as a computer, a set of interconnected computers (cloud computing), etc. The server 3 acts as a server with respect to the client device 2 in method steps that will be described here after. But the use of the functional term "server" does not limit the physical nature of the server 3, which can be of the same type as the device 2 or of a different type. Advantageously, the server 3 offers more resource than the device 2 in terms of any one of: processing resource, random access memory, storage memory, power and network bandwidth.

The device 2 and the server 3 are connected to each other via a network 4, which can take any possible form, such as a fixed network (e.g. PSTN), a cellular network (e.g. GSM, UMTS, LTE), another type of radiocommunication network (e.g. Wifi), an IP network, a combination of any one of the preceding networks, etc. This supposes that the device 2 and the server 3 have appropriate means to communicate with each other in a way that is suitable with respect to the network 4, as is conventional.

At some point in time, the device 2 or its user may wish to run an application that will provide a respective service. But before that (and even irrespective of whether the device 2 will ever run the application), a pre-processing unit 1 may work on the application code as follows.

The pre-processing unit 1 can consist in any type of device or system. It may also be part of a more complex device or system. As a non-limiting example, the pre-processing unit may be a software or hardware module in a computer.

The pre-processing unit 1 holds a code of the above-mentioned application, containing all the instructions to carry out the application when run on a device. This application code 5 is for example the source code of said application. In this case, any suitable computer language may be used for the source code (C, C++, Java, etc.). Several source codes in different languages may even be used by the pre-processing unit 1 for the same application. Alternatively, the application code 5 may be the binary code of said application, or other.

In step 6, the pre-processing unit 1 analyzes the application code 5 so as to identify parts of the application code 5 that satisfy or are assumed to satisfy at least one criterion based on resource consumption (i.e. at least one criterion in terms of resource consumption). As an example, the application code parts to be identified are the ones that are assumed to consume the highest amount of resource when run on a device. According to another example, the application code parts are the ones that are assumed to consume an amount of resource higher than a threshold. Other criteria may also be envisaged instead or in addition to the ones mentioned above.

When talking of resource, the following examples can apply: processing resource (e.g. CPU), random access memory (RAM), power (e.g. a battery level), storage memory (e.g. HDD, SD-card) and network bandwidth. If several criteria based on resource consumption are used in step 6, they may all relate to the same type of resource or to different types of resource.

The criterion (or criteria) may be defined with respect to a specific device type, such as a device of the same type as the device 2. For example, one criterion may be that the application code parts to be identified are the ones which would consume more than 30% of the total amount of CPU when run on the device 2.

Alternatively, the criterion (or criteria) may be defined with respect to a generic device with generic or unspecified resource characteristics. For example, one criterion may be that the application code parts to be identified are the three coherent application code parts that would consume the highest amount of CPU among all coherent application code parts identifiable in the application code.

Of course, the examples given above are for illustrative purpose only. Many other criteria could be envisaged and used within the framework of the present disclosure, as will appear to one skilled in the art.

Advantageously, the application code parts may be identified by the pre-processing unit 1 by means of a semantic analyzer, such as the Lex & Yacc analyzer.

Lex & Yacc is a set of tools which help to manipulate grammars (ex: in our case, a grammar is a programming language: C, C++, Java, others). It is used to develop compilers and interpreters based on a lexical ("Lex": stands for "Lexical Analyzer Generator") and a grammar ("Yacc": stands for "Yet Another Compiler-Compiler").

A compiler or interpreter for a programming language is often decomposed into two parts:

Read the source program and discover its structure;
Process this structure, e.g. to generate the target program.
Lex & Yacc can generate program fragments that solve the first task. The task of discovering the source structure again is decomposed into subtasks:

Split the source file into tokens ("Lex");
Find the hierarchical structure of the program ("Yacc").
More detail on Lex & Yacc can be found for example at the following Web page addresses: http://dinosaur.compilertools.net/#overview and http://www.irit.fr/~Martin.Strecker/Teaching/2004/M1_S8_IUP_ISI_Traduction/intro_lex_yacc.pdf Such semantic analyzer can identify code blocks with high complexity or high demand resources (ex: memory allocation for scalar types such as the tables, vectors, etc.). Other techniques may be used however, instead or in addition to a semantic analyzer.

The assumption that application code parts may satisfy a resource consumption criterion can be derived from another observation. For example, an assumption of high consumption may be derived from the high complexity level of the application code parts (e.g. the application takes time $O(n^2)$ to run the application code parts).

In the example of FIG. 1, at the end of step 6, two application code parts 8 and 9 have been identified by the pre-processing unit 1 in the application code 5.

In step 14, those identified application code parts 8 and 9, which satisfy or are assumed to satisfy said at least one criterion based on resource consumption, are transmitted from the pre-processing unit 1 to the server 3 for further use. Only the application code parts 8 and 9 are transmitted. The other parts of the application code 5, which do not satisfy or are assumed not to satisfy the above mentioned criterion, are not sent to the server 3.

Note that the application code parts 8 and 9 may be transmitted to the server 3 in their state resulting directly from the code analysis step 6, e.g. as source code parts. A further compilation step may then be performed on the server side so as to get compiled blocks 8 and 9. Alternatively, a compilation may take place on the pre-processing unit side or on the way between the pre-processing unit 1 and the server 3 (as symbolized by reference 15), so that the application code parts 8 and 9 are already in a compiled form when they are received by the server 3.

Moreover, in step 10, the pre-processing unit 1 generates an enriched application code 11 from the application code 5. This code generation step may be carried out before, during or after the above-mentioned transmission step 14.

Compared to the application code 5, the enriched application code 11 is arranged to further include added code portions 12 and 13 to be run right before the application code parts 8 and 9 respectively. The code portion 12 includes instructions to call for the execution of the application code part 8 on the server only if at least one criterion based on resource overload (i.e. at least one criterion in terms of resource overload) is satisfied at the time the application code part 8 is to be run. Likewise, the code portion 13 includes instructions to call for the execution of the application code part 9 on the server only if at least one criterion based on resource overload (i.e. at least one criterion in terms of resource overload) is satisfied at the time the application code part 9 is to be run.

The criterion (criteria) based on resource overload may take any suitable form. When talking of resource, the following examples can apply: processing resource (e.g. CPU), random access memory (RAM), storage memory (e.g. HDD, SD-card), power (e.g. a battery level) and network bandwidth. If several criteria based on resource overload are used, they may all relate to the same type of resource or to different types resource.

A non-limiting example of a criterion based on resource overload would be that an absolute or relative amount of processing resource, random access memory, storage memory, power or network bandwidth exceeds a corresponding threshold. In this case, the criterion is particularly simple, as it consists in a basic comparison between a resource usage value and a respective threshold. However, more complex criteria may be used, as will appear to one skilled in the art. A detailed example will be discussed below with reference to FIG. 3.

The check of whether said criterion based on resource overload is satisfied or not is to be performed by the device that will run the enriched application code 11 and at the time the corresponding application code part is to be run. Thus, a first check using a resource overload criterion may be performed when the application code part 8 is to be run (e.g. when running the preceding code portion 12), while a second check using the same or another resource overload criterion may be performed when the application code part 9 is to be run (e.g. when running the preceding code portion 13).

Advantageously, no further check of a resource overload criterion is performed at other points in time. In particular, there is no need for a continuous monitoring of resource usage, which avoids computation and complexity on the device side.

The instructions included in the code portions 12 and 13 may be arranged for only triggering a check of said criterion based on resource overload with respect to the device on which the enriched application code 11 will be run, as will be further explained with reference to the device 2. In this case, the device must hold further means (e.g. an additional computer program) for carrying out this check in response to the trigger of the code portions 12 and 13. Alternatively, the code portions 12 and 13 may contain all the instructions needed for checking said criterion based on resource overload with respect to the device on which the enriched application code 11 will be run. In this case, there is no need for the device to have additional means.

By calling for the execution of a given application code part on the server, it must be understood that the device on which the enriched application code 11 will be run will send a mere invocation request to the server 3 for it to run said application code part and returns the results of this running. There is no need for such call to include further information, such as a state or application code, which avoids long and heavy transmissions between the device and the server.

In step 16, the enriched application code 11 is transmitted to the device 2 from the pre-processing unit 1. This may happen for example responsive to the device 2 requesting downloading of the application (from the pre-processing unit 1 directly or from any other device or system storing the application code 5 and cooperating with the pre-processing unit 1, such as an application store platform). In this way, the device 2 memory is not unnecessarily congested with code of applications that will never be run. The enriched application code 11 is transmitted to the device, that is not only the original application code 5, but also the code portions 12 and 13 discussed above.

Note that the enriched application code 11 may be transmitted to the device 2 in its state resulting directly from the generation step 10, e.g. as a source code. A further compilation step may then be performed on the device side so as to get a compiled application code. Alternatively, a compilation may take place on the pre-processing unit side or on the way between the pre-processing unit 1 and the device 2 (as symbolized by reference 17), so that the enriched application code 11 is already in a compiled form when it is received by the device 2.

Figure 2:
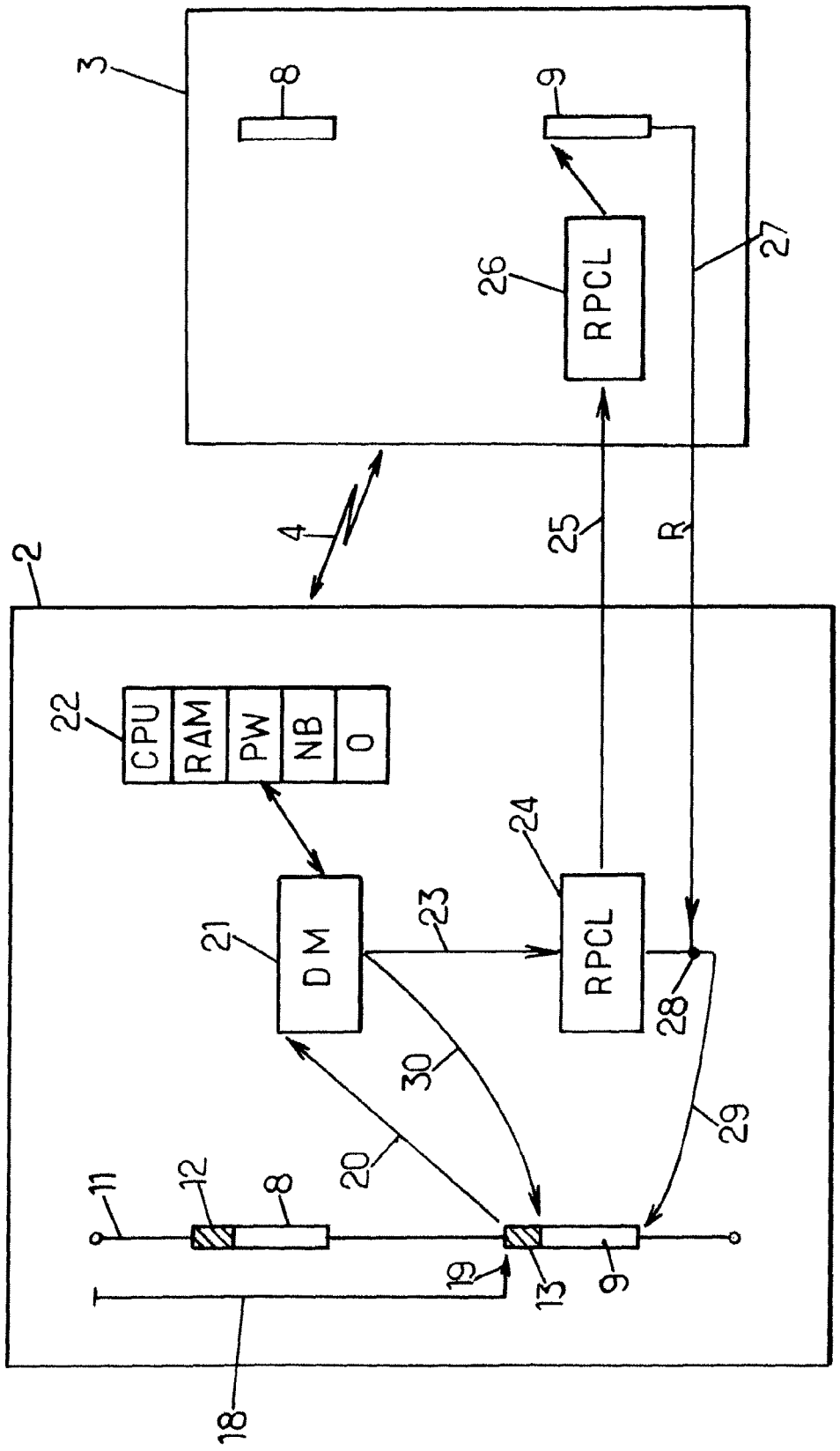
FIG. 2 is a block diagram showing distributed application running steps carried out according to an exemplary embodiment of the disclosure.

FIG. 2 shows the device 2 and the server 3 of FIG. 1, but at a later point in time, i.e. after they have received the enriched application code 11 and the application code parts 8 and 9 respectively from the pre-processing unit 1.

More precisely, FIG. 2 shows a situation when the device has started running the enriched application code 11. The arrow 18 terminated by the pointer 19 shows at what stage of the running of the enriched application code 11 the device currently is. A first part of the enriched application code 11, including the application code part 8, has already been executed. The next instructions to be run by the device 2 are the ones included in the code portion 13.

As explained before, when running the instructions included in the code portion 13 of the enriched application code 11, it is checked whether at least one criterion based on resource overload is satisfied with respect to the device 2.

In the example of FIG. 2, this is done by means of a decision making unit DM 21, although any other means may also be suitable, including means external to the device 2, as will appear to one skilled in the art.

As discussed above, the resource overload criterion (criteria) may relate to different types of resource, alone or in any possible combination, as illustrated in FIG. 2 by the reference 22, including CPU, RAM, PW (for power), NB (for network bandwidth) and O (for others).

Depending on the outcome of the resource overload criterion check, the decision making unit DM 21 decides either to call for the execution the application code part 9 on the server 3 (route 23), or to run the application code part 9 on the device 2 itself (route 30).

The call to the server can take any possible form. For example, it may make use of the Remote Procedure Call (RPC) protocol, defined in the RFC 1057 released in June 1988 by the Internet Engineering Task Force (IETF) organization. In this case, the device 2 is equipped with an RPC linker 24 capable of sending an invocation request for code running 25 to an RPC linker 26 installed in the server 3, over the network 4. Other calling techniques may be used instead or in addition to RPC, such as Hypertext Transfer Protocol (HTTP).

On reception of the call 25 for running the code block corresponding to the application code part 9, the server 3 runs said code block and then returns the result R thereof to the device 2 (reference 27).

The result R is received by the device 2 at a time 28 which constitutes a synchronization point. Based on the received result R, the device 2 can continue to run the enriched application code 11 right after the application code part 9 (and thus without running the application code part 9 on the device side).

The end of the enriched application code 11 can be run by the device 2, since it does not include other added portions that would require a new decision from the decision making unit 21.

If, in contrast, the decision making unit 21 decides to run the application code part 9 on the device 2, then no call is sent to the server 3. And the end of the enriched application code 11, including the application code part 9, can be run by the device 2.

Figure 3:
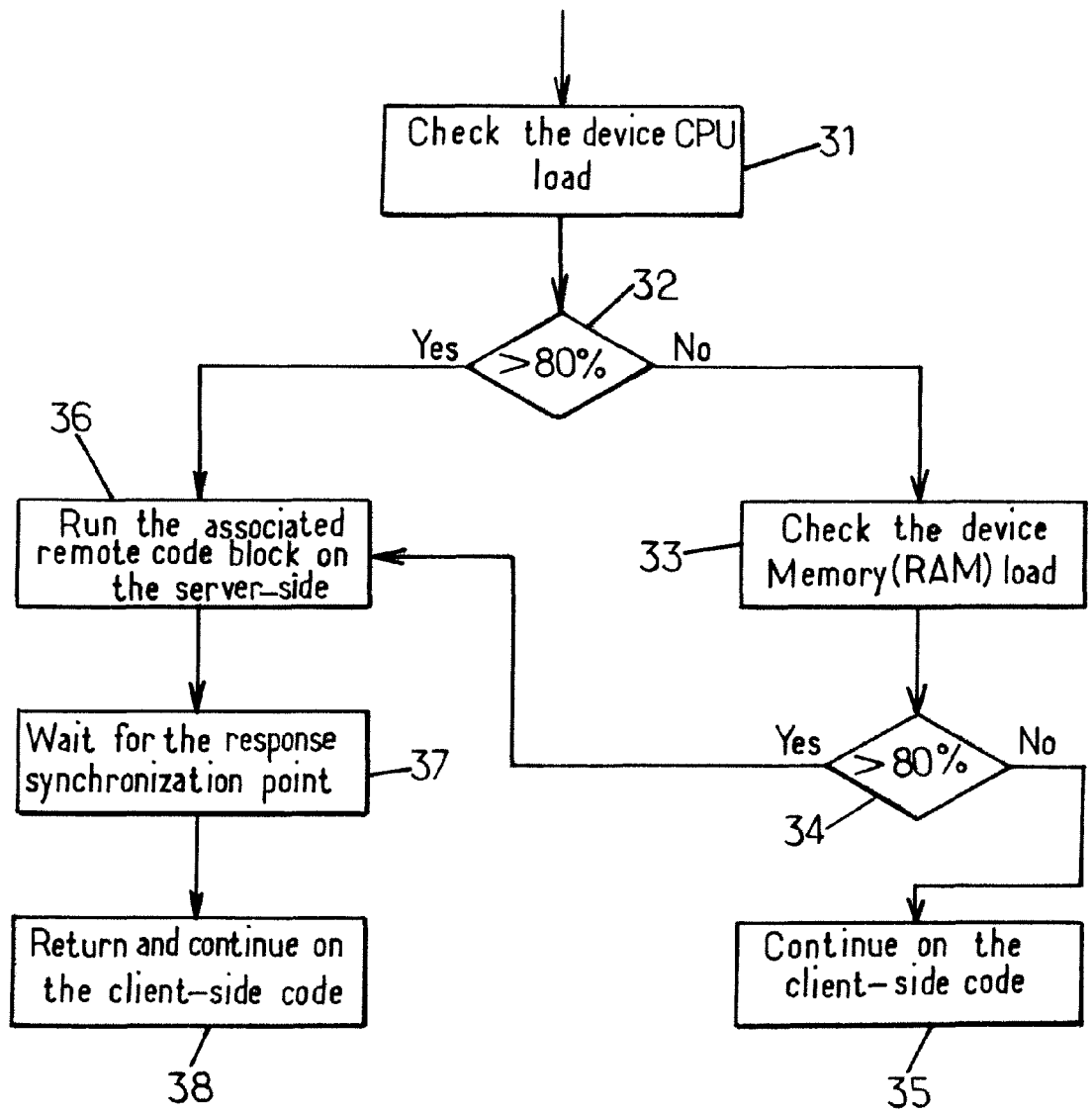
FIG. 3 is a flow chart showing an exemplary decision making that may be implemented within the framework of the embodiment of FIG. 2.

FIG. 3 shows a non-limiting example of distributed running of an application that may be achieved with an embodiment of the present disclosure. In this example, both the CPU and RAM loads on the device 2 at the current time (corresponding to the running time of the code portion 13) are compared to respective thresholds to make a decision. The order of the comparisons may or may not matter.

In step 31, the CPU load of the device 2 is assessed. In step 32, this CPU load is compared to a threshold expressed as a percentage of the total CPU capacity, namely 80% in this example.

If the CPU load exceeds 80% of the total CPU capacity of the device 2, which is interpreted as the device 2 being overloaded in terms of CPU processing (the corresponding resource overload criterion is thus satisfied), the decision maker DM 21 decides to run the code block corresponding to the application code part 9 on the server-side (offload case 36). A respective call is thus made to request the server to operate accordingly.

The device 2 then waits for the response from the server (step 37), and when the response is received it continues to run the application locally until a new decision is required (step 38).

If, in contrast, the CPU load is found not to exceed 80% of the total CPU capacity in step 32, the RAM load on the device 2 is in turn assessed (step 33) and then compared to a threshold expressed as a percentage of the total RAM capacity, namely 80% in this example (step 34).

If the RAM load exceeds 80% of the total RAM capacity of the device 2, which is interpreted as the device 2 being overloaded in terms of RAM use (the corresponding resource overload criterion is thus satisfied), the decision maker DM 21 decides to run the code block corresponding to the application code part 9 on the server-side (offload case 36). A respective call is thus made to request the server to operate accordingly. The above-mentioned steps 37 and 38 are then carried out.

If, in contrast, the RAM load is found not to exceed 80% of the total RAM capacity in step 34, the decision maker DM 21 decides to continue to run the application, including the application code part 9, on the device 2 (step 35).

Many other criteria and scenarios may be envisaged instead or in addition, as will appear to one skilled in the art.

As can be derived from the above description, an embodiment of the present disclosure thus uses a middle approach with static partitioning of the application code performed by a specific unit and made available to the server beforehand+ real time decision making based on available resources on the device. Such middle approach avoids too heavy burden on the device, while offering decision making adapted to the actual real time situation in terms of device resource usage.

An embodiment of the present disclosure is adapted to any type of application, even if they are very resource demanding, such as gaming, augmented reality, etc.

All or part of the functions described so far may be carried out by computer programs including appropriate code instructions as will appear to one skilled in the art. These computer programs can be stored on non-transitory computer-readable media, for example, and when executed by a computer perform one or more of the method steps described herein.

Although the present disclosure has been described with reference to one or more examples, workers skilled in the art will recognize that changes may be made in form and detail without departing from the scope of the disclosure and/or the appended claims.

We claim:

1. A method for allowing distributed running of an application between a device and a server connected via a network, the method comprising the following steps carried out by a pre-processing unit:

analyzing a code of the application for identifying parts that satisfy or are assumed to satisfy at least one first criterion based on resource consumption;

transmitting only the identified application code parts to the server;

generating from the application code an enriched application code, said enriched application code comprising the application code and at least one added code portion,
wherein said at least one added code portion is arranged to trigger the device to call for execution of one of the identified application code parts on the server only if at least one second criterion based on resource overload is satisfied at the time said application code part is to be run, and is arranged to trigger the device to execute said identified application code part if the second criterion is not satisfied; and
transmitting the enriched application code to the device.

2. The method as claimed in claim 1, wherein the at least one first criterion based on resource consumption and/or the at least one second criterion based on resource overload relate to at least one of the following resources: processing resource, random access memory, storage memory, power or network bandwidth.

3. The method as claimed in claim 1, wherein transmitting the enriched application code to the device is performed responsive to the device requesting downloading of said application.

4. The method as claimed in claim 1, further comprising, after the device has started running the enriched application code and each time an application code part within the enriched application code is to be run:
checking whether the at least one second criterion based on resource overload is satisfied with respect to the device;
if said at least one second criterion is satisfied, calling for execution of the corresponding application code part on the server; and
if said at least one second criterion is not satisfied, running said application code part on the device.

5. A pre-processing apparatus configured to allow distributed running of an application between a device and a server connected via a network, the pre-processing apparatus comprising:

an analyzer configured to analyze code of the application for identifying parts that satisfy or are assumed to satisfy at least one first criterion based on resource consumption;
a transmitter configured to transmit only the identified application code parts to the server;
a code generator configured to generate from the application code an enriched application code, said enriched application code comprising the application code and at least one added code portion, wherein said at least one added code portion is arranged to trigger the device to call for execution of one of the identified application code parts on the server only if at least one second criterion based on resource overload is satisfied at the time said application code part is to be run, and is arranged to trigger the device to execute said identified application code part if the second criterion is not satisfied;
a transmitter configured to transmit the enriched application code to the device;
a computer; and
non-transitory computer-readable media comprising code instructions stored thereon, which when executed by the computer configure the computer to implement at least one of the analyzer or the code generator.

6. The method as claimed in claim 1, wherein analyzing the code of the application comprises identifying the application code parts that require or are assumed to require more than the first criterion of resources to be executed.

7. The method as claimed in claim 1, wherein analyzing the code of the application comprises identifying the application code parts that require or are assumed to require the highest amount of resources to be executed.

* * * * *